United States Patent
Green

(10) Patent No.: US 9,426,059 B2
(45) Date of Patent: Aug. 23, 2016

(54) SYSTEMS AND METHODS FOR UTILIZING PROTECTION PATHS

(71) Applicant: Michael C. Green, Central Valley, NY (US)

(72) Inventor: Michael C. Green, Central Valley, NY (US)

(73) Assignee: Fujitsu Limited, Kawasaki-shi (JP)

( * ) Notice: Subject to any disclaimer, the term of this patent is extended or adjusted under 35 U.S.C. 154(b) by 571 days.

(21) Appl. No.: 13/913,701

(22) Filed: Jun. 10, 2013

(65) Prior Publication Data

US 2014/0362684 A1 Dec. 11, 2014

(51) Int. Cl.
*H04L 12/703* (2013.01)

(52) U.S. Cl.
CPC ...................................... *H04L 45/28* (2013.01)

(58) Field of Classification Search
None
See application file for complete search history.

(56) References Cited

U.S. PATENT DOCUMENTS

| | | | | |
|---|---|---|---|---|
| 7,330,440 B1* | 2/2008 | Bryant | ................ | H04L 45/00 370/254 |
| 2006/0203720 A1* | 9/2006 | Kano | ................ | H04L 41/0663 370/228 |
| 2006/0256712 A1* | 11/2006 | Imajuku | ............. | H04J 14/0284 370/218 |
| 2011/0317551 A1* | 12/2011 | Hachiya | ................ | H04L 45/22 370/228 |

* cited by examiner

*Primary Examiner* — Brandon Renner
*Assistant Examiner* — Prince A Mensah
(74) *Attorney, Agent, or Firm* — Baker Bitts L.L.P.

(57) ABSTRACT

The present disclosure includes a method of utilizing protect paths, the method includes receiving a first message regarding a first failure in a first working path and receiving a second message regarding a second failure in a second working path. The method also includes matching a pattern comprising received messages regarding working path failures to a stored group comprising a plurality of connection identifications (IDs) that share identical protection paths and share a resource trail, the group being associated with a group identification (ID). The method additionally includes transmitting a third message to provision the identical protect paths for the group associated with the group identification. The present disclosure may also include associated systems and apparatus. The present disclosure may further include methods, systems, and apparatuses associated with provisioning groups utilized in methods of the present disclosure.

11 Claims, 8 Drawing Sheets

| GROUP ID | WORKING PATH FAILURE PATTERN | PROTECT PATH |
|---|---|---|
| 1 | 205a, 205b, 205c | A-E-F-G-D |
| 2 | 205b, 205c | A-E-F-G-D |
| 3 | 205a | A-E-F-G-D |
| 4 | 205b | A-E-F-G-D |
| 5 | 205c | A-E-F-G-D |
| ... | ... | ... |

*FIG. 4*

| WORKING/CONNECTION ID | WORKING PATHS | PROTECT PATH |
|---|---|---|
| 205a | A-LAB-B-LBH-H-LHD-D | A-E-F-G-D |
| 205b | A-LAB-B-LBC-C-LCI-I-LID-D | A-E-F-G-D |
| 205c | A-LAB-B-LBC-C-LCD-D | A-E-F-G-D |
| ... | ... | ... |

*FIG. 5A*

| FAILED RESOURCE | RESOURCE TRAIL | WORKING/CONNECTION ID |
|---|---|---|
| LAB | LAB | 205a, 205b, 205c |
| B | LAB-B | 205a, 205b, 205c |
| LBH | LAB-B-LBH | 205a |
| H | LAB-B-LBH-H | 205a |
| LHD | LAB-B-LBH-H-LHD | 205a |
| LBC | LAB-B-LBC | 205b, 205c |
| C | LAB-B-LBC-C | 205b, 205c |
| LCI | LAB-B-LBC-C-LCI | 205b |
| I | LAB-B-LBC-C-LCI-I | 205b |
| LCD | LAB-B-LBC-C-LCD | 205c |
| ... | ... | ... |

FIG. 5B

SYSTEMS AND METHODS FOR UTILIZING PROTECTION PATHS

TECHNICAL FIELD

The present invention relates generally to the field of optical communication networks and, more particularly, to systems and methods of utilizing protection paths.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. In the past, optical networks have employed a ring topology in which each node on the network connects to two other nodes. However, increases in traffic have necessitated the utilization of mesh topology. Mesh topology allows many nodes to be connected to each other. Such a configuration allows for protection paths to function as a backup if there are problems with a working path functioning as the primary path of communication.

SUMMARY

In one embodiment, the present disclosure may include a method of provisioning groups in an electronic device. The method may comprise determining a plurality of connection identifications (IDs) that share identical protection paths and share a resource trail and assigning the plurality of connection IDs to a group with an associated group identification (ID). The method may additionally comprise storing the group ID and the plurality of connection IDs and transmitting a copy of the stored group IDs and the plurality of connection IDs to an electronic device of the identical protection paths.

In another embodiment, the present disclosure may include a method of utilizing protect paths, the method includes receiving a first message regarding a first failure in a first working path and receiving a second message regarding a second failure in a second working path. The method also includes matching a pattern comprising received messages regarding working path failures to a stored group comprising a plurality of connection identifications (IDs) that share identical protection paths and share a resource trail, the group being associated with a group identification (ID). The method additionally includes transmitting a third message to provision the identical protect path for the group associated with the group identification.

In a further embodiment, the present disclosure may include a system comprising a head node electronic device. The head node electronic device may comprise a first storage medium configured to store a plurality of connection identifications (IDs) that share identical protection paths originating at the head node and share a resource trail, the plurality of connection IDs represented by a group associated with a group identification (ID). The head node electronic device may further include a transmitter configured to transmit a message indicating that the identical protection paths of the group are to be provisioned, the message including the group identification. The system may also comprise a protection path electronic device comprising a second storage medium configured to store the group identification associated with the group and at least a next node of the protection path of the group. The protection path electronic device may further comprise a receiver configured to receive the message including the group identification.

BRIEF DESCRIPTION OF THE DRAWINGS

For a more complete understanding of the present disclosure and its features and advantages, reference is now made to the following description, taken in conjunction with the accompanying drawings, in which:

FIG. 4 illustrates an example of a database, in accordance with the present disclosure;

FIG. 5A illustrates example illustrations of working paths and protect paths, in accordance with the present disclosure;

FIG. 5B illustrates example illustrations of resource trails, in accordance with the present disclosure;

DESCRIPTION OF EXAMPLE EMBODIMENTS

The present disclosure relates to utilizing protection paths. Connection identifications (IDs) that share a resource trail and have protection paths that utilize identical nodes may be grouped together and assigned a group identification. If an error occurs on a working path resource of the shared resource trail, rather than sending a message for each individual connection ID in the group to provision its protection, the present disclosure may include a method whereby a single message may be sent with the group identification indicating that the protection paths for all connection IDs in the group are to be provisioned.

Figure 1:
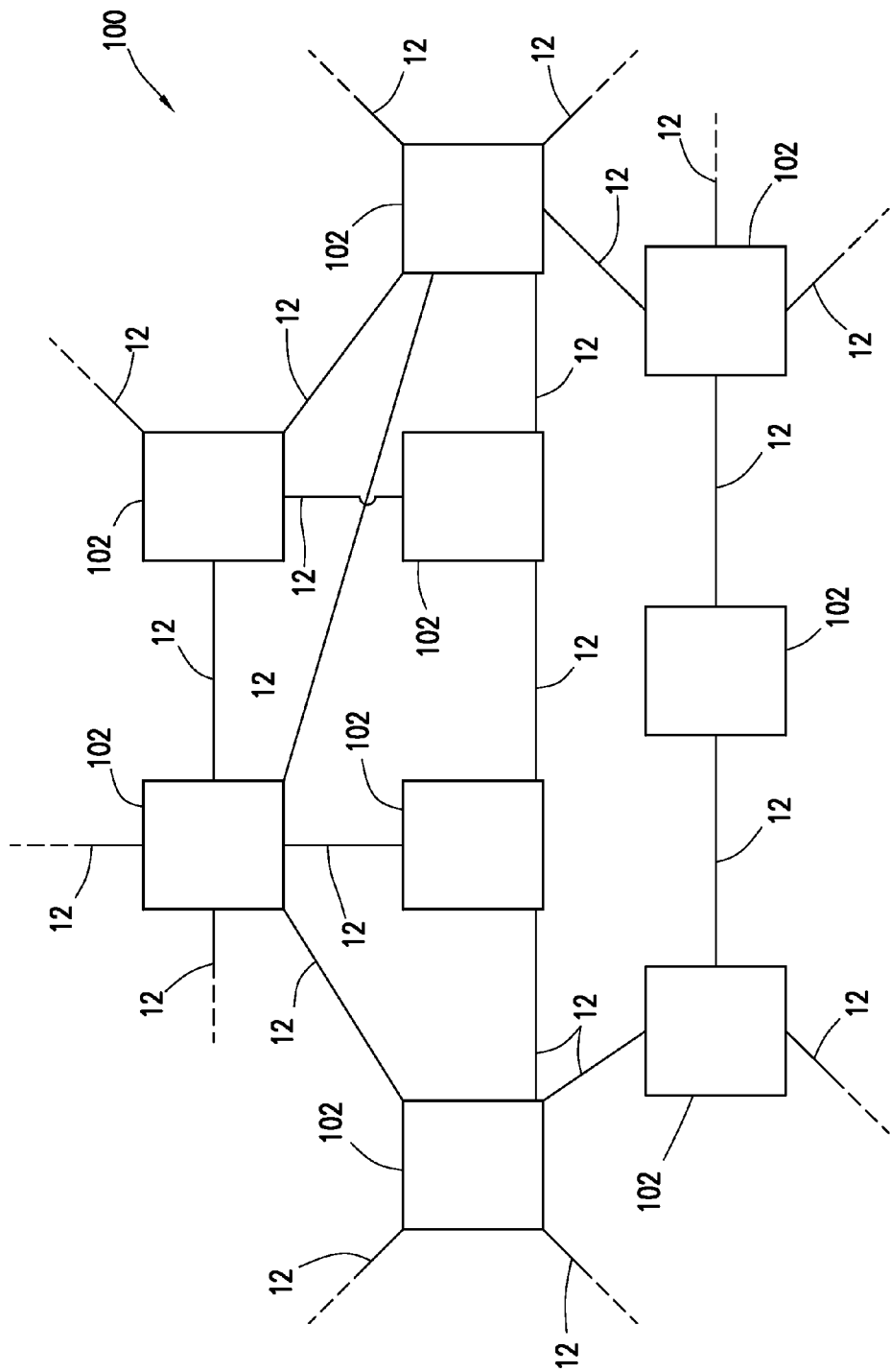
FIG. 1 illustrates an example embodiment of a network, in accordance with the present disclosure.

FIG. 1 illustrates a block diagram of an example network 100, in accordance with one embodiment of the present disclosure. In certain embodiments, network 100 may be a shared mesh network. Network 100 may include one or more transmission media 12 operable to transport one or more signals communicated by components of network 100. The components of network 100, coupled together by transmission media 12, may include a plurality of network elements or nodes 102. In the illustrated network 100, each node 102 is coupled to one or more other nodes 102 to create a mesh. However, any suitable configuration of any suitable number of nodes 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks. Network 100 may represent all or a portion of a short-haul metropolitan network, a long-haul inter-city network, and/or any other suitable network or combination of networks.

Each transmission medium 12 may include any system, device, or apparatus configured to communicatively couple nodes 102 to each other and communicate information between corresponding nodes 102. For example, a transmission medium 12 may include an optical fiber, an Ethernet cable, a T1 cable, copper cable, a WiFi signal, a Bluetooth signal, or other suitable medium. In embodiments of the present disclosure, optical fibers may include thin strands of glass capable of communicating signals over long distances with very low loss. Optical fibers may include any suitable type of fiber, such as a Single-Mode Fiber (SMF), Enhanced Large Effective Area Fiber (ELEAF), or a TrueWave® Reduced Slope (TW-RS) fiber. Information may be transmitted and received through network 100 by modulation of one or more wavelengths of light to encode the information on the wavelength. In optical networking, a wavelength of light may also be referred to as a channel. Each channel may be configured to carry a certain amount of information through network 100. While network 100 is shown as having a single transmission medium 12 communicatively coupling nodes 102, it will be appreciated that transmission medium 12 may include multiple physical links coupling nodes 102.

Network 100 may communicate information or "traffic" over transmission media 12. Traffic may include information transmitted, stored, or sorted in network 100. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 100 may be structured in any appropriate manner including, but not limited to, being structured in frames, packets, or an unstructured bit stream.

Each node 102 in network 100 may include any suitable system operable to transmit and receive traffic. In the illustrated embodiment, each node 102 may be operable to transmit traffic directly to one or more other nodes 102 and receive traffic directly from the one or more other nodes 102. Nodes 102 may include any suitable arrangement of components operable to perform the operations of the node 102. As an example, node 102 may include logic such as hardware, software, other logic, and/or any other suitable combination of the preceding. Logic may include any suitable device operable to execute instructions and manipulate data to perform operations, for example, a processor, microprocessor, field-programmable gate array (FPGA), or application specific integrated circuit (ASIC). Node 102 may include an interface operable to receive input, send output, process the input and/or output, or any combination of the preceding. An interface may include ports, conversion software, or both. Node 102 may include memory, such as, logic operable to store and facilitate retrieval of information. Memory may include Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding, and/or any other suitable components. Node 102 may be implemented as an electronic device.

In certain embodiments of the present disclosure, nodes 102 may be configured to transmit optical signals through network 100 in specific wavelengths or channels. Nodes 102 may include any system, apparatus or device configured to convert an electrical signal into an optical signal and transmit the optical signal. For example, nodes 102 may each comprise a laser and a modulator configured to receive electrical signals and modulate the information contained in the electrical signals onto a beam of light produced by the laser at a particular wavelength and transmit the beam carrying the signal throughout the network. Nodes 102 may include client cards, switches, such as, optical transport network (OTN) switches, line cards, one or more multiplexers, one or more amplifiers, one or more reconfigurable optical add/drop multiplexers, and/or one or more receivers.

Traffic may be transmitted by nodes 102 within an OTN according to various protocols such as ITU G.709. Network elements 102 may transmit traffic in data packets or frames known as Optical channel Transport Unit (OTU) frames. The OTU frames may include an Optical channel Data Unit (ODU) signal within the OTU. The ODU may have a particular signal structure based on bandwidth, for example, ODU0, ODU1, ODU2, ODU2e, ODU3, ODU4, ODU5, and ODUflex. These may be collectively referred to as ODUk. Some ODU signals may be high order ODUs (HO-ODU) and others may be low order ODUs (LO-ODUs). A HO-ODU may include more than one LO-ODU. For example, an ODU1 signal may carry two ODU0 signals, or one ODU2 signal may carry eight ODU0 signals or four ODU1 signals. Alternatively, an ODU2 signal may carry a combination such as two ODU0 signals and three ODU1 signals. Each single ODU0 signal may be referred to as a tributary slot (TS). For example, an ODU2 signal may include up to eight TSs. Within a wavelength there may be HO-ODUs that have TSs and each TS or a combination of TSs may be a channel to carry information.

Network 100 may include both a management or control plane as well as a transport plane. The management plane may be used generally for administration and other management of the network, while the transport plane may be used generally for transmission of data through the network. However, the transport plane may carry some administrative data and facilitate some network management, and the management plane may carry some data. The ODUk signals may be part of the transport plane, as opposed to the control plane or management plane.

A network resource may refer to node 102, transmission media 12, subcomponents thereof, or any combinations thereof. For example, a network resource may refer to an optical transmitter within node 102, or may refer to an optical fiber within transmission media 12.

A connection identification (ID) may refer to a particular path travelling through network 100. For example, data may flow from a head node, and then traverse a series of nodes, ultimately to arrive at a tail node. This data flow from end-to-end may have a connection ID identifying the data flow. A connection ID may have a working path, representing the primary flow path for the data, and may also have one or more protection paths.

Figure 2:
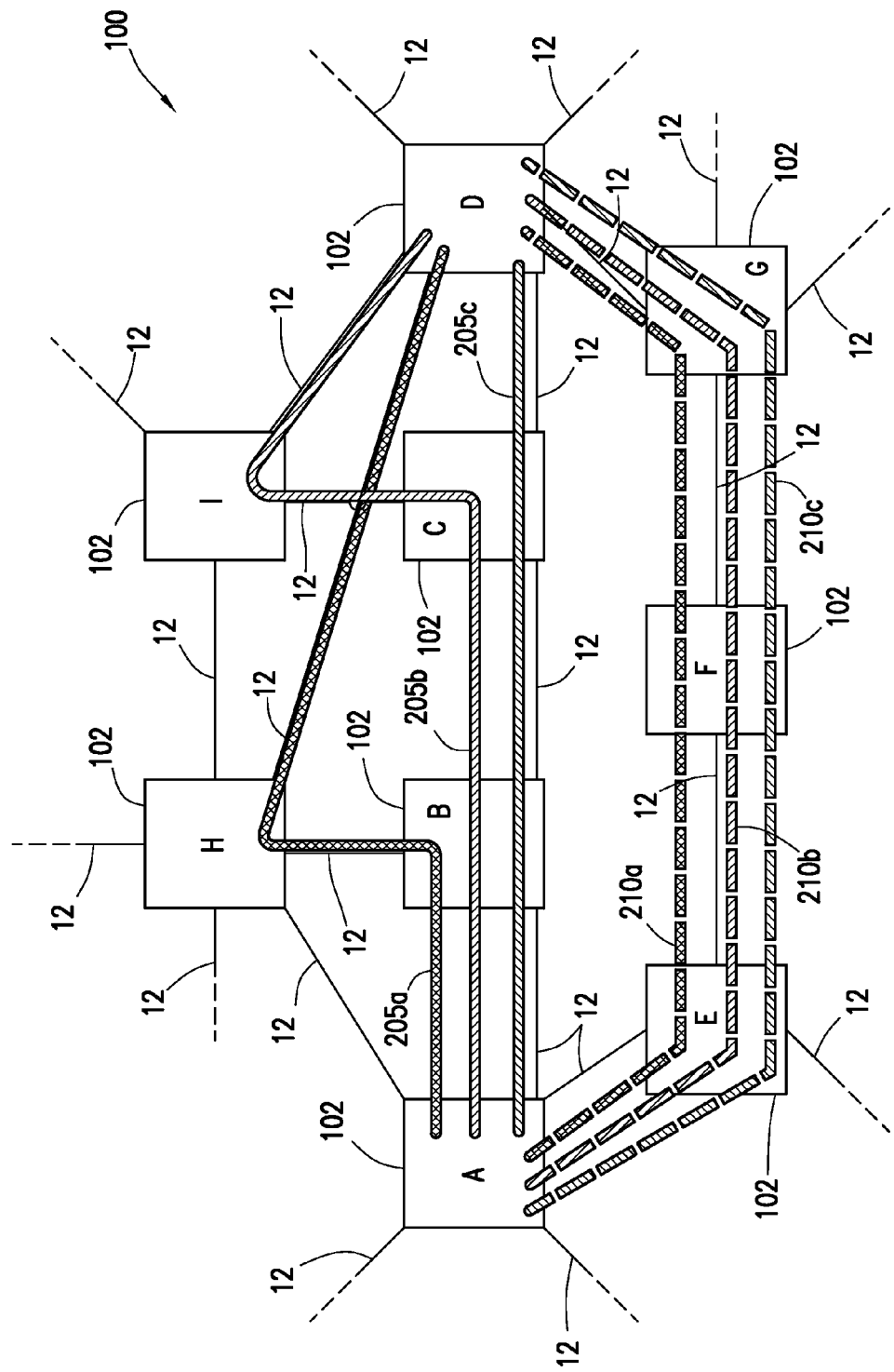
FIG. 2 illustrates an example embodiment of a network utilizing protection paths, in accordance with the present disclosure.

FIG. 2 illustrates an example of a network employing protection or backup paths. These paths may provide an alternative channel of communication in the event of disruption of a primary path of communication or working path for a connection ID. For example, a first communication for a first connection ID may follow a first working path 205a from node A to node D, including the links between nodes (e.g., LAB for link between nodes A and B) via the path (A-LAB-B-LBH-H-LHD-D). Node A, where the communication begins, may be referred to as a head node for the working path 205a of the first connection ID, and node D, where the communication terminates, may be referred to as a tail node. A second communication for a second connection ID may follow a second working path 205b, flowing from node A to node D via the path (A-LAB-B-LBC-C-LCI-I-LID-D). Node A may be the head node and node D may be the tail node of working path 205b. A third communication for a third connection ID may follow a third working path 205c, flowing from node A to node D via the path (A-LAB-B-LBC-C-LCD-D). Node A may be the head node and node D may be the tail node of working path 205c. A protection path may be disjoint from a working path, in other words, a protection path may utilize different network resources from the working path besides the head node and tail node.

A resource trail may indicate a sequence of one or more working path resources, for example, links and nodes. In some embodiments, a resource trail may indicate the working path resources between a point in the working path and head node. For example, and in no way limiting, a resource trail may include only nodes (A), only links (LAB), nodes and links (A-LAB-B-LBH), or any combination thereof.

As shown in FIG. 2, the first connection ID utilizing working path 205a has a protection path 210a. Protection path 210a flows from node A to node D via the sequence of nodes (A-E-F-G-D). The second connection ID utilizing working path 205b has a protection path 210b. Protection path 210b flows from node A to node D via the sequence of nodes (A-E-F-G-D). The third connection ID utilizing working path 205c has a protection path 210c. Protection path 210c flows from node A to node D via the sequence of nodes (A-E-F-G-D).

As shown in FIG. 2, some transmission media 12 and/or nodes 102 may be designated as a protection path for more than one working path. As shown in FIG. 2A, in some embodiments, just as nodes carrying working paths may carry more than one working path (for example, node A and node B), nodes carrying protection paths may also carry more than one path once fully provisioned. While FIG. 2 shows certain nodes 102 only being used as working paths (for example, nodes B, C, H, and I) or protected paths (for example, nodes E, F, and G), it will be appreciated that each of nodes 102 may be utilized to carry working paths, protection paths, or any combination thereof.

In some embodiments, the protection resource utilized in the protection path may be a TS within a HO-ODU on a given link. Each TS of a given link may be used for one of carrying primary or working traffic, carrying secondary or protected traffic, or be unassigned. For example, a connection ID may utilize one or more TSs. The TSs may be configured by the management plane or control plane. A link may be the connection between two nodes within a network, and may include any hardware, software, logic, or combinations thereof at either of the two nodes and the transmission media connecting the two nodes.

Protection paths may be initially reserved or initially provisioned only in the management or control plane. Stated another way, these protection paths may only exist in memory and are not fully provisioned until needed. In this way, each working path may recognize its protection path or paths without actually fully provisioning the network resources.

When a failure occurs, a message may be sent to activate the protected path. For example, the head node may receive notification of a failure from the working path and then send a message downstream to protection path nodes to activate the protected path and then wait for a message to come back upstream from the tail node indicating that the path has been fully provisioned and can begin carrying data.

As described previously, connection IDs that share a resource trail and have protection paths that utilize identical nodes may be grouped together and assigned a group identification (ID). If an error occurs on a working path resource of the shared resource trail, rather than sending a message for each individual connection ID in the group to provision its protection path, a single message may be sent with the group ID indicating that the protection paths for all connection IDs in the group are to be provisioned.

Figure 3:
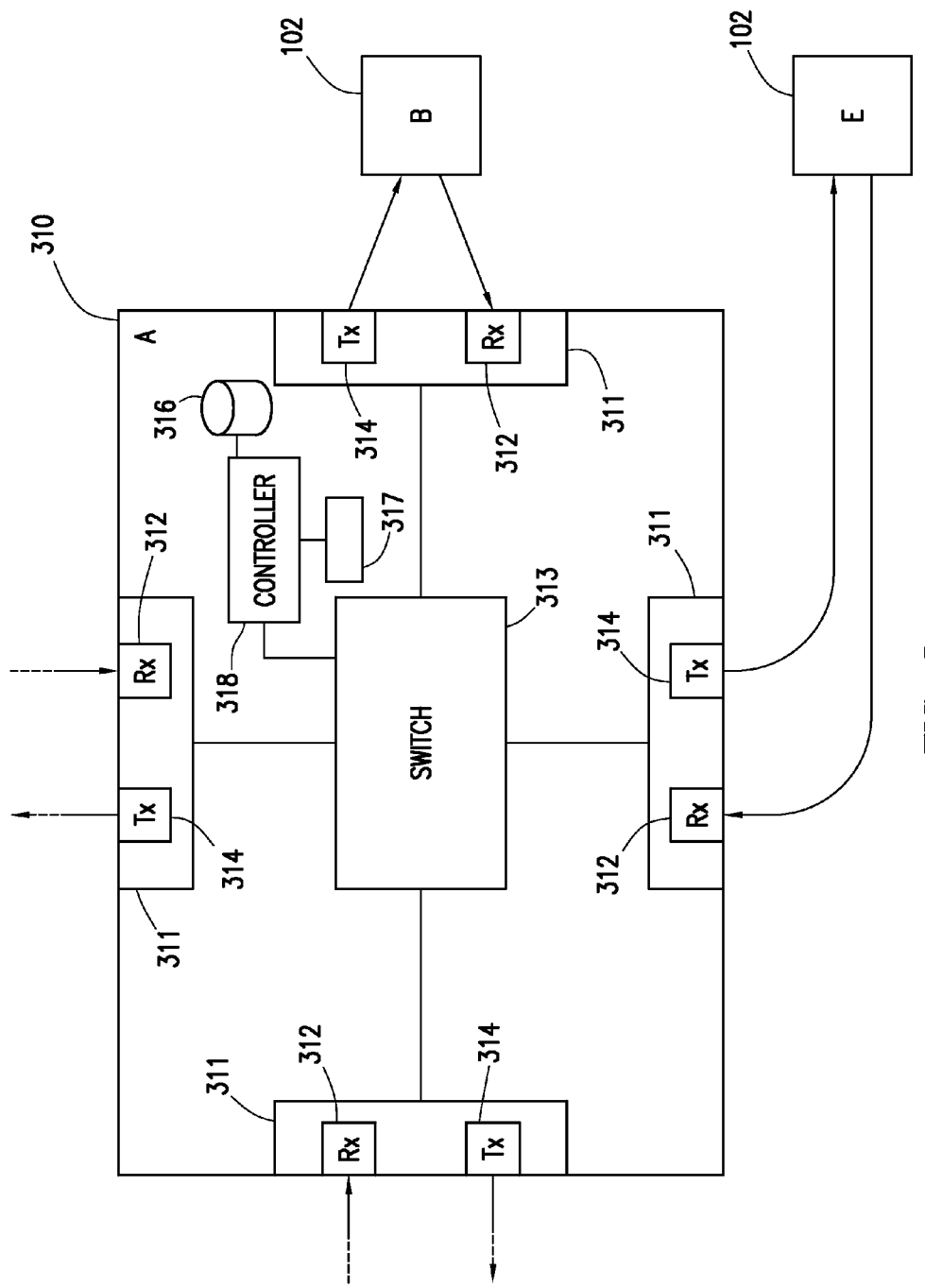
FIG. 3 illustrates an example of a head node, in accordance with the present disclosure.

FIG. 3 illustrates an example embodiment of a system for utilizing protection paths. For example, FIG. 3 may represent a more detailed view of node A shown in FIG. 2. While node A may be identified as node 310 in FIG. 3, it will be appreciated that this is for convenience in identifying certain features of node A, and it will be understood that any of nodes 102 may have similar features and functionality. Node 310 may represent a head node of a protection path for a connection ID. Head node 310 may include receivers 312 and transmitters 314 on network cards 311 for communicating with different nodes of a network. For example, node 310 may communicate with nodes B and E. Node 310 may also comprise a switch 313, a controller 318, a storage medium 316, and a timer 317.

Node 310 may include switch 313. Switch 313 may be hardware, software, or some combination thereof configured to block, pass, or redirect optical signals received from receivers 312. For example, in some embodiments, switch 313 may be a reconfigurable optical add-drop multiplexer (ROADM) that optically switches signals received from any one of receivers 312.

Controller 318 may be any system, device, or apparatus configured to manage and/or control the operation of node 310. For example, controller 318 may be configured to issue commands and/or other signals to manage and/or control data transmissions to and/or from node 310. As another example, controller 318 may compare messages received from receivers 312 with stored groups of connection IDs and associated group IDs. Controller 318 may include a microprocessor, microcontroller, digital signal processor (DSP), ASIC, field programmable gate array ("FPGA"), EEPROM, or any combination thereof. As shown in FIG. 3, controller 318 may be communicatively coupled to switch 313, storage medium 316, and/or timer 317.

Storage medium 316 may be implemented as one or more non-transitory, tangible, computer-readable storage medium possessing structures. As an example and not by way of limitation, storage medium 316 may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. Storage medium 316 may be volatile, non-volatile, or a combination of volatile and non-volatile, as appropriate.

Storage medium 316 may store a group of one or more connection IDs that share a resource trail and have identical protection paths. A plurality of such groups may be stored in storage medium 316. Each group may be assigned a group identification (ID). The group ID may be unique for the group at the particular node, for a particular region of the network, or for the entire network. Storage medium 316 may include a database 302 storing this information. In some embodiments, storage medium 316 may store a copy of the groups, group IDs. The copy may also include the protection paths for each group, the connection IDs in each group, and the working path of the connection IDs such that the copy may be used to identify a group based on received working path failure messages.

By way of example and with reference to FIG. 2, a first group identification may identify the group of connection IDs that share the resource trail between nodes A and B and have an identical protection path. This first group may include working paths 205a, 205b, and 205c as they all use the resource trail between nodes A and B and all have identical protection paths, namely, path (A-E-F-G-D). A second group identification may identify the group of connection IDs that share the resource trail between nodes A and C and have an identical protection path. This second group may include working paths 205b and 205c. A third group identification may identify the group of connection IDs that share the resource trail between nodes A and D and have identical protection paths. This may include working path 205c. These groups are merely exemplary, and it will be understood that any number of groups may be identified. In some embodiments, a group may be assigned for each set of paths that share a working path resource and have an identical protection path throughout an entire network. An example of a database holding these stored groups is shown in FIG. 4, with examples of the working paths and protection paths shown in FIG. 5A, and the effect of failures shown in FIG. 5B. For example, as shown in FIG. 5B, if the working path resource LHD (i.e. the link between node H and node D) fails, the resource trail LAB-B-LBH-H-LHD will be affected by the failure. Only working path 205a may be affected by such a failure.

As an example of how the working path failure messages may be used to identify a group, the groups illustrated in FIG. 4 will be used. For example, with reference to FIG. 2A, if an error message is received regarding working path 205b and 205c, but not regarding working path 205a, a failure has occurred relating to the second group. The order of failure message may not matter. For example, the failure messages may come as 205b then 205c, or 205c and then 205b, with both identifying the second group. As an alternative example, if an error message is received regarding all of working paths 205a, 205b, and 205c, a failure has occurred relating to the first group.

Node 310 may receive working path failure messages from nodes associated with working paths, for example, nodes B, C, D, H, or I. In some embodiments, node 310 is in direct communication with each of nodes B or H. In other embodiments, node 310 may be in communication indirectly with nodes C, D, and I via nodes B or H. For example, node I may transmit a message to node C, which may transmit the message to node B, which may transmit the message to node 310.

In some embodiments, controller 318 may analyze failure messages received from working path nodes 320 to generate a pattern of received failure messages. Controller 318 may then use that pattern to compare against the stored groups and group IDs or an electronic copy thereof to determine what group may be affected by the pattern of working path failures. For example, controller 318 may determine that working path failure messages were received from working paths 205b and 205c, and will compare that pattern with the stored groups and group IDs or the electronic copy thereof. Recognizing that messages were received from only these two paths, controller 318 may determine that group ID "2" identifies the group affected by the pattern of failure messages. This may be performed by matching the pattern of received working path failure messages to a particular group in the stored groups.

Node 310 may additionally include a timer 317. Timer 317 may be initiated when a first error message is received and prevent controller 318 from determining what group has been affected by a working path failure until expiration of timer 317. For example, with reference to FIG. 2, if a message were received regarding a failure of working path 205a, timer 317 may be initiated. Node 310 may then wait to see if messages were received from other working paths that may have been affected by the working path failure. If messages were not received from any other working paths before expiration of the timer, controller 318 may have the pattern of a single working path failure message, namely, that of working path 205a. Controller 318 may recognize that group ID "3" is the group affected by this pattern of failure messages by matching the pattern to the copy of stored groups and group IDs, or an electronic copy thereof. By using timer 317, node 310 may collect the failure messages associated with a single failure affecting multiple working paths and generate a single message or group of messages responsive to that failure, rather than providing individual messages responsive to each individual received failure message.

In some embodiments, once controller 318 has determined what group ID may be associated with the group affected by the pattern of working path failure messages, controller 318 may transmit a message to node E. The message may contain the group identification. Node E may contain a storage medium storing a subset of the database stored at node A. For example, node E may only store group IDs and protection paths for groups that includes node E in its protect path. Thus, after receiving the message with the group ID from head node 310 indicating the group associated with the group ID should have their protected paths fully provisioned, node E may transmit the message with the group identification to the next node in the protection path for that group, for example, node F. Node E may also fully provision the sequence of nodes for the protection path resources to be used by the connection IDs associated with the group identification. Node E may provision the resources first and then transmit the message to node F, or node E may transmit the message and then provision the resources, or these tasks may be done simultaneously.

Figure 6A:
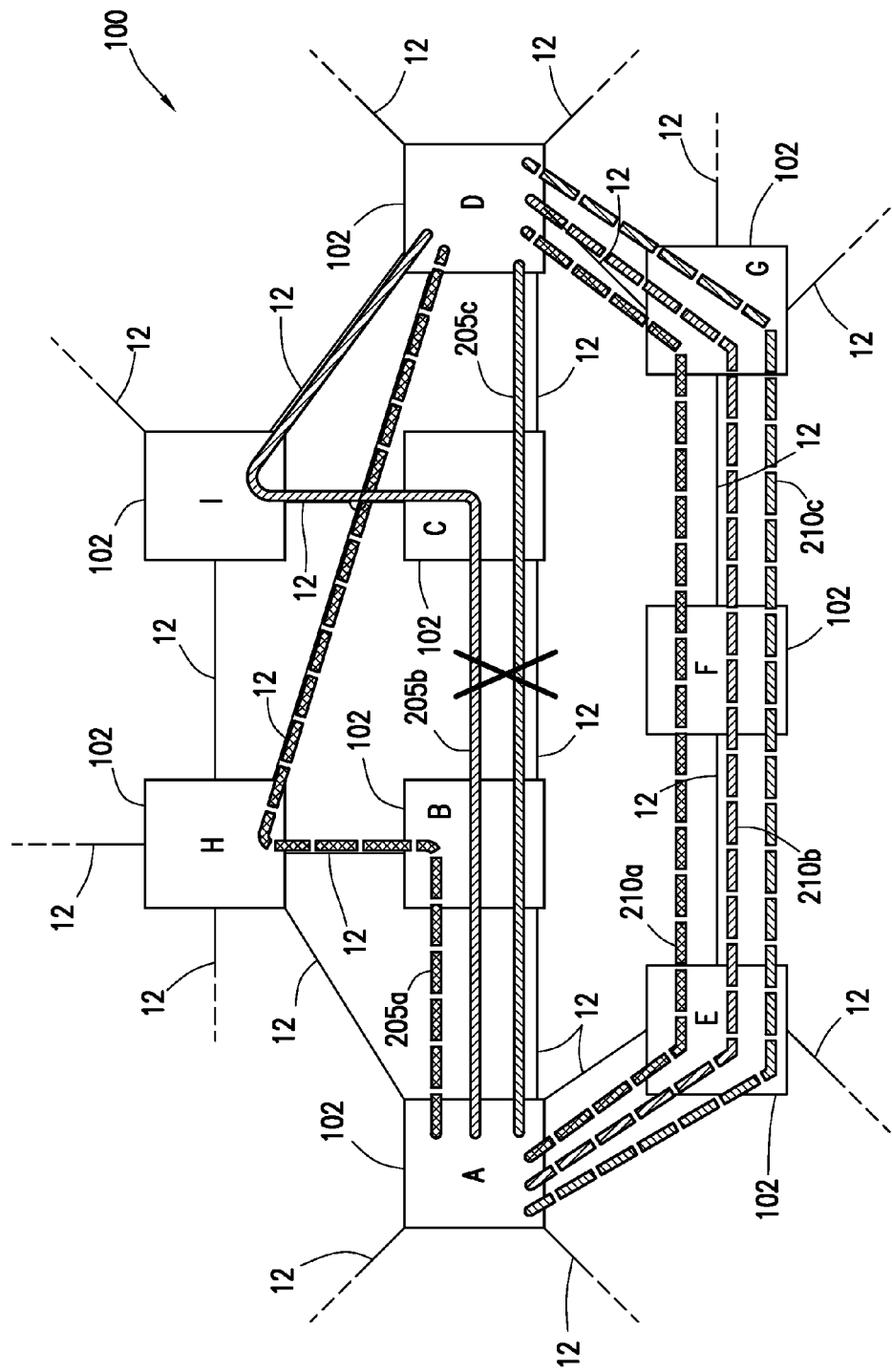
FIGS. 6A and 6B illustrate example embodiments of a network utilizing protection paths, in accordance with the present disclosure.
Figure 6B:
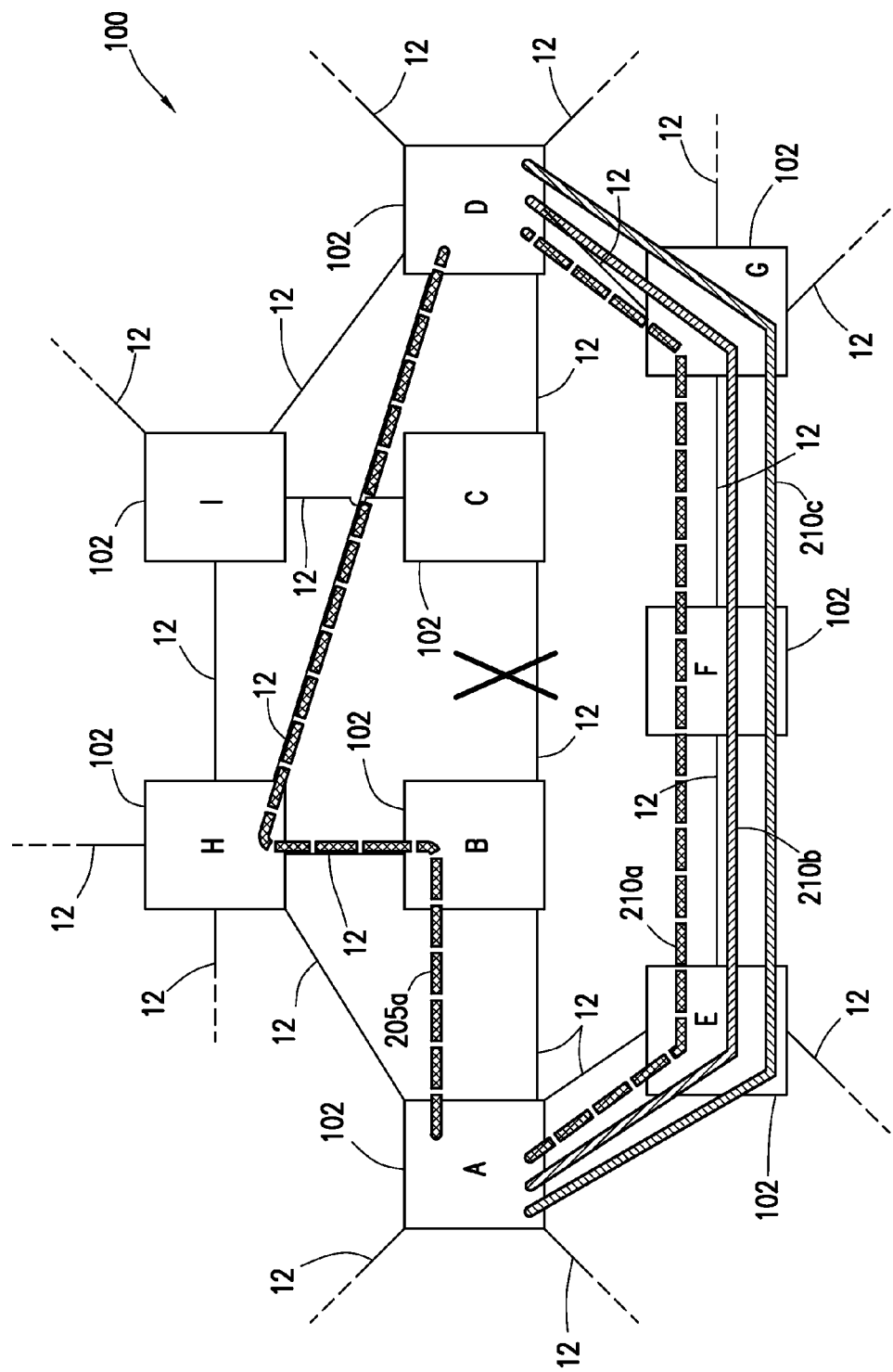

FIGS. 6A and 6B provide an example illustration of utilizing protection paths in accordance with the present disclosure. As shown in FIG. 6A, an error or problem (failure 610) may occur in the connection between nodes B and C. This may disrupt the data flowing along working paths 205b and 205c, while not affecting working path 205a. The data flow may then be switched to protection paths 210b and 210c. For example, as shown in FIG. 6B, the data previously flowing along working paths 205b and 205c may now follow fully provisioned protection paths 210b and 210c along the path (A-LAE-E-LEF-F-LFG-G-LGD-D). A more detailed explanation of how this may occur will be provided with reference to FIG. 7.

Figure 7:
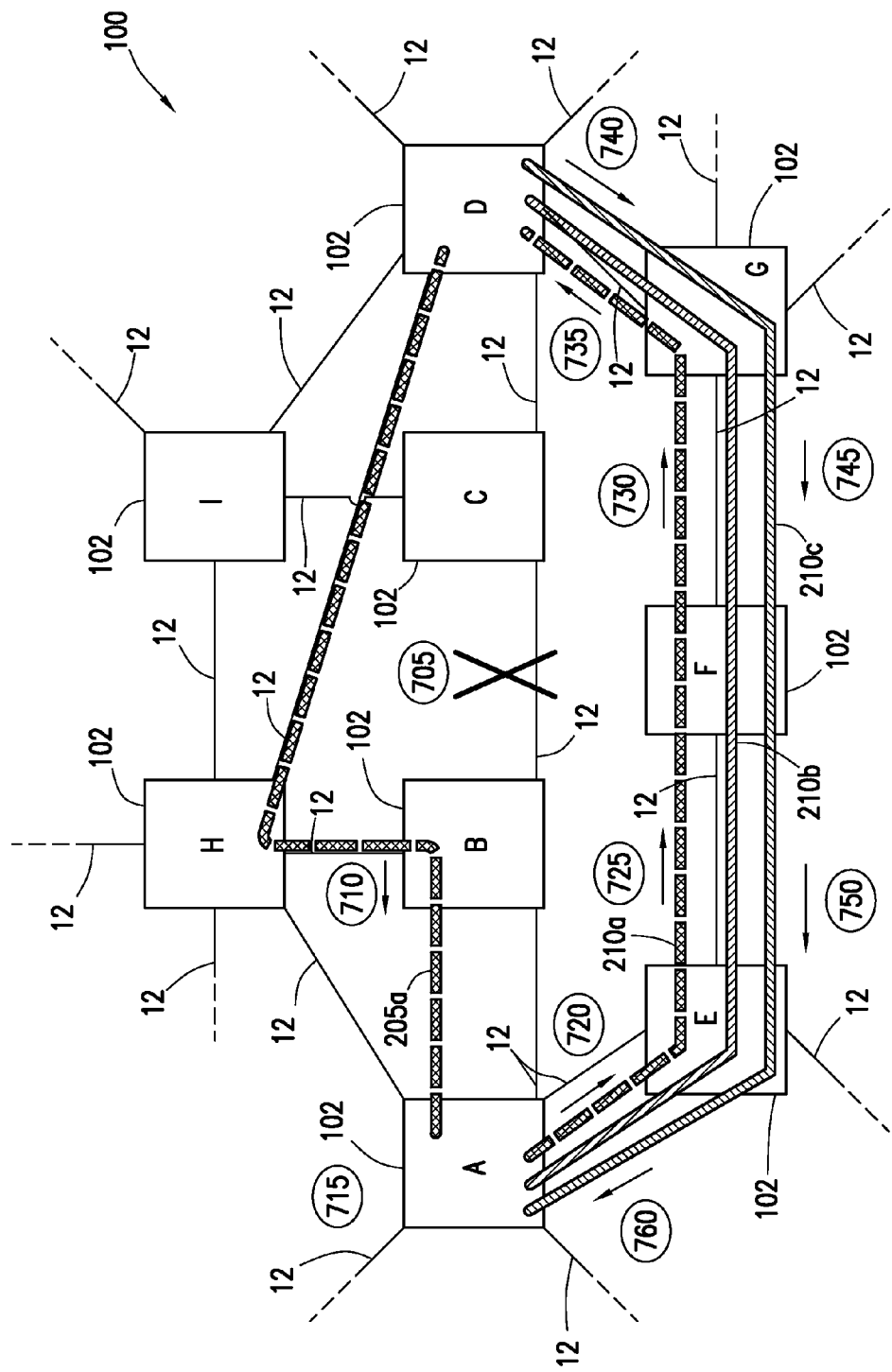
FIG. 7 illustrates an example set of steps which may be taken to utilize protection paths, in accordance with the present disclosure.

FIG. 7 illustrates an example set of steps which may be taken to utilize protection paths in accordance with the present disclosure. In FIG. 7, each encircled numeral may indicate a step. At 705, an error may occur on a working path resource. For example, one of the transmitters or receivers at nodes B or C may experience a mechanical or electrical failure, disrupting the flow of network traffic between nodes B and C. In response to the disruption of communication between nodes B and C, at 710, node B may generate a first message regarding working path 205b, indicating that working path 205b has experienced a failure. This message may be passed to node A. Node B may also generate a second message regarding working path 205c, indicating that working path 205c has experienced a failure. These messages may be created concurrently, or at different times. These messages may be created within quick succession, for example, between zero and two-hundred milliseconds apart. Either message may be generated first.

At 715, node A may receive the first message indicating a failure of working path 205b. In some embodiments, node A may then initiate a timer to wait for additional messages. While the timer is running, node A may receive the second message indicating a failure of working path 205c. Upon expiration of the timer, a controller of node A may utilize a copy of stored groups and group IDs to determine a group that may require its protected path to be provisioned. For example, the controller may detect that a failure message was received only regarding working paths 205b and 205c (i.e., one was not received for working path 205a). The controller may then match a pattern of received message to a group ID identifying a group, for example, Group 2. Node A may then look to a database to determine what nodes may carry the protected paths for that group, for example, the database shown in FIG. 4. Node A may determine, for example, that the next node in the protected paths originating at head node A may be node E.

At 720, node A may then transmit a single message containing the group identification to node E, indicating that node E is to fully provision the protected paths for all of the connection IDs in the group associated with the group ID. Node E may utilize a stored database (for example, that shown in FIG. 4), or other information format, to determine what connection IDs are associated with the group and are to be fully provisioned. Node E may then fully provision those resources associated with the group's protected paths in response to the message. The database stored at Node E may also indicate what other nodes are in the identical protected paths of the group. Alternatively, the database at Node E may only indicate a node address of the next node in the protection paths for the group, for example, node F.

At 725, node E may transmit a message containing the group identification to node F. In some embodiments, this may be identical to the message received by node E. Node F may also utilize a stored database to provision the appropriate protected path resources associated with the group, and at 730, may transmit a message to node G. Node G may handle the message in a similar manner to nodes E and F. At 535, node G may transmit a similar message to node D.

At 740, node D, the tail node, may receive the message from node G indicating that the protected paths for the group are to be provisioned. Node D may complete provisioning the protected path resources, and may then transmit a message back to node G indicating that the protected paths have been reserved and provisioned, and the protected paths are now prepared to start carrying data. At 745, node G may relay that message to node F. At 750, node F may relay that message to node E. At 760, node E may relay that message to node A.

Upon receiving the message that the protected paths have been provisioned and are ready to begin carrying data, node A may switch the data which was to be flowing along failed working paths 205b and 205c to the protected paths 210b and 210c that were fully provisioned.

While identical protection paths may be articulated for a particular group, it will be appreciated that multiple connection IDs may be carried along that protection sequence of nodes. For example, each connection ID may have a different time slot of multiple time slots for a data flow along identical nodes. Additionally, it will be appreciated that multiple and different physical links between nodes may be used in identical protection paths, so long as the sequence of nodes is identical. In some embodiments, multiple connection IDs may have identical working paths. For example, multiple connection IDs may utilize different time slots for data flowing along identical nodes for their working paths.

In accordance with the present disclosure, a single message may be transmitted to provision protected paths for a given group of working paths affected by a single failure event, rather than sending an individual message for each working path that may be affected. While the example provided to facilitate understanding may provide a simple embodiment, it will be appreciated that this may occur on a much larger scale with greatly increased complexity. In such embodiments, generating a single message for each working path may create bottlenecks in transmission of data to provision protected paths, causing delays in utilizing the protected paths. In some embodiments, by utilizing the group identification messages as described herein, delay times in provisioning protected paths may be greatly reduced, for example, by a factor of ten.

In some embodiments, a head node may transmit a message to a management device indicating where a working path failure has occurred by reference to the stored groups and/or group IDs. For example, a head node may be able to transmit a message indicating that a working path failure occurred upon a given resource trail based on the group ID. This may facilitate a network administrator or some other individual identifying where a network error may need to be addressed and corrected by providing a narrow window of locations in which the error may have occurred.

In some embodiments, the process of initially determining the groups may be automated. For example, an electronic device may transmit a message to traverse the network to determine overlap in resource trails. The electronic device may then compare that to a list of initially provisioned protection paths to determine a plurality of paths that share identical protection paths and share a resource trail. The electronic device may then assign a group identification to that group of paths that share a resource trail and have the same protection path. This information may be stored such that it can be recalled by the electronic device or utilized by other electronic devices. The electronic device may then transmit a copy of the stored group identifications and any other desired information associated therewith to the nodes that form the protection path of the group. In some embodiments, a given node of a protection path may only receive a subset of the entire set of group identifications, as it may only receive groups that utilize that protection path node. In other embodiments, each node in the network may receive a complete copy of each group identification and the group associated therewith. The electronic device may additionally generate a correlation of patterns of working path failures and group identifications. For example, the correlation may indicate that for a given set of failure messages received, a particular group may be affected and may need its protected path fully provisioned. This may be represented in the stored group and/or group IDs.

The electronic device to facilitate initially and/or automatically determining the groups and arranging to utilize the protection paths may be a head node of the network. Alternatively, the electronic device may be a management node, management server, or some other administrative device. In such an embodiment, each head node may be transmitted a copy of the protection paths that utilize that node as a head node and groups and/or group IDs associated with the protection paths and connection IDs using those protection paths.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions. For example, a line card of a node may receive a status message and a processor of the node may process and read the message. The processor may then generate and transmit the message via a line card.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of a processor, one or more portions of a memory, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A method of utilizing protection paths of network, the method comprising:
   determining, from among a plurality of connection identifications (IDs), connection IDs that share identical protection paths and share a resource trail of a network, each of the plurality of the connection IDs is associated with a working path of the network;
   assigning the determined plurality of connection IDs to a group with an associated group identification (ID);
   storing the group ID and the determined plurality of connection IDs in a first node of the network;
   receiving, at the first node, a first message regarding a first failure in a first working path of the network;
   receiving, at the first node, a second message regarding a second failure in a second working path of the network;
   determining, from the stored group ID and the determined plurality of connection IDs, a group ID associated with both the connection ID of the first working path and the connection ID of the second working path; and
   transmitting a third message, that includes the group ID associated with both the connection ID of the first working path and the connection ID of the second working path, that indicates that the protection paths associated with the first working path and the second working path are to be provisioned.

2. The method of claim 1, wherein the group ID and the identical protection paths are stored in a database at the first node.

3. The method of claim 1, wherein the group ID associated with both the connection ID of the first working path and the connection ID of the second working path is transmitted to all nodes of the identical protection paths.

4. The method of claim 1, wherein the first node is a head node of the identical protection paths.

5. The method of claim 1, wherein the determining, from among a plurality of connection IDs, connection IDs that share identical protection paths and share a resource trail further comprises transmitting a message to traverse working paths of the plurality of connection IDs to facilitate analysis of overlap of working path resources.

6. The method of claim 5, wherein the determining, from among a plurality of connection IDs, connection IDs that share identical protection paths and share a resource trail further comprises analyzing initially provisioned protection paths.

7. The method of claim 1, further comprising in response to receiving the first message, initiating a timer to wait for additional messages.

8. The method of claim 7, wherein the determining, from the stored group ID and the determined plurality of connection IDs, a group ID associated with both the connection ID of the first working path and the connection ID of the second working path is not made until after expiration of the timer.

9. The method of claim 7, wherein the third message is not transmitted until after expiration of the timer.

10. The method of claim 7, wherein the timer counts for between 0 and 200 milliseconds.

11. The method of claim 1, further comprising:
   receiving a fourth message regarding a third failure in a third working path; determining that the third working path does not share a protection path with the identical protection paths; and
   transmitting a fifth message to provision the protection path.

* * * * *